(12) United States Patent
Sears et al.

(10) Patent No.: US 12,090,708 B2
(45) Date of Patent: Sep. 17, 2024

(54) SELF HEATING STRUCTURAL ADHESIVES FOR OUT-OF-AUTOCLAVE AND OUT-OF-OVEN CURING

(71) Applicant: Bell Textron Inc., Fort Worth, TX (US)

(72) Inventors: Philip C. Sears, McKinney, TX (US); Samuel L. Bryk, Fort Worth, TX (US); Bradyn C. Crider, Weatherford, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 17/552,466

(22) Filed: Dec. 16, 2021

(65) Prior Publication Data

US 2023/0191714 A1 Jun. 22, 2023

(51) Int. Cl.
  *B29C 65/00* (2006.01)
  *B29C 65/48* (2006.01)
  *B29C 65/50* (2006.01)
  B29C 65/34 (2006.01)
  B29L 31/30 (2006.01)

(52) U.S. Cl.
  CPC ...... *B29C 65/4815* (2013.01); *B29C 65/4835* (2013.01); *B29C 65/5057* (2013.01); *B29C 66/1122* (2013.01); *B29C 66/71* (2013.01); *B29C 65/34* (2013.01); *B29C 65/3456* (2013.01); *B29C 65/3468* (2013.01); *B29L 2031/3088* (2013.01)

(58) Field of Classification Search
  CPC .. B29C 65/34; B29C 65/3456; B29C 65/3468
  See application file for complete search history.

(56) References Cited

U.S. PATENT DOCUMENTS

| | | | | |
|---|---|---|---|---|
| 2,662,045 | A * | 12/1953 | Baggott | ..................... C09J 7/35 |
| | | | | 156/273.9 |
| 4,571,921 | A * | 2/1986 | Wolfson | .............. B29C 66/8322 |
| | | | | 156/379.7 |
| 4,746,389 | A | 5/1988 | DiGenova | |
| 5,389,184 | A * | 2/1995 | Jacaruso | ............. B29C 66/7394 |
| | | | | 219/544 |
| 5,939,190 | A | 8/1999 | Pfaff et al. | |
| 6,054,679 | A * | 4/2000 | Ito | ..................... B29C 66/81431 |
| | | | | 219/245 |
| 6,250,686 | B1 * | 6/2001 | Becker | .............. B29C 66/52231 |
| | | | | 285/21.2 |

(Continued)

FOREIGN PATENT DOCUMENTS

| | | |
|---|---|---|
| CA | 2461276 A1 | 4/2003 |
| CN | 1179608 A | 4/1998 |

(Continued)

*Primary Examiner* — Philip C Tucker
*Assistant Examiner* — Nickolas R Harm
(74) *Attorney, Agent, or Firm* — Frost Brown Todd LLP (57) ABSTRACT

Systems and methods are described for applying a self-heating structural adhesive to components of aircraft or other structures. A conductive scrim can be placed in between layers of adhesive for use in joining two components together. Leads can be provided to apply an electrical current to the scrim, which can raise the temperature of the system and cure the adhesives, creating a strong bond with a conductive layer there between.

16 Claims, 5 Drawing Sheets

(56) References Cited

U.S. PATENT DOCUMENTS

| | | | |
|---|---|---|---|
| 6,569,789 B1 | 5/2003 | Shioda et al. | |
| 7,628,879 B2 | 12/2009 | Ackerman | |
| 9,022,745 B2* | 5/2015 | Shimono | B32B 27/12 |
| | | | 416/244 R |
| 9,061,478 B2 | 6/2015 | Choi et al. | |
| 9,426,878 B2 | 8/2016 | Choi | |
| 9,868,265 B2 | 1/2018 | Simmons et al. | |
| 9,935,316 B2 | 4/2018 | Kim et al. | |
| 9,962,907 B2 | 5/2018 | Price et al. | |
| 10,124,562 B2 | 11/2018 | Yamamoto et al. | |
| 10,285,219 B2 | 5/2019 | Fetfatsidis et al. | |
| 10,400,370 B2 | 9/2019 | Lee et al. | |
| 10,596,780 B2 | 3/2020 | Seo et al. | |
| 11,027,856 B2 | 6/2021 | Sang et al. | |
| 2004/0055699 A1* | 3/2004 | Smith | H05B 3/342 |
| | | | 156/273.9 |
| 2005/0184053 A1* | 8/2005 | Wilkinson | B29C 66/1122 |
| | | | 219/545 |
| 2009/0053406 A1* | 2/2009 | Ackerman | C09J 7/21 |
| | | | 427/140 |
| 2010/0203789 A1 | 8/2010 | Takebayashi et al. | |
| 2011/0094671 A1* | 4/2011 | Wang | B32B 37/06 |
| | | | 156/272.2 |
| 2011/0132537 A1 | 6/2011 | Choi et al. | |
| 2015/0053328 A1* | 2/2015 | Wang | B29C 65/603 |
| | | | 156/92 |
| 2016/0089863 A1* | 3/2016 | Fetfatsidis | H05B 3/06 |
| | | | 428/688 |
| 2016/0302264 A1* | 10/2016 | Kessler | H01C 13/00 |
| 2016/0312074 A1 | 10/2016 | Choi et al. | |
| 2016/0319165 A1 | 11/2016 | Choi et al. | |
| 2016/0333232 A1 | 11/2016 | Choi et al. | |
| 2017/0198735 A1* | 7/2017 | Garhart | B29C 65/34 |
| 2018/0178457 A1* | 6/2018 | Grgac | B29C 66/54 |

FOREIGN PATENT DOCUMENTS

| | | |
|---|---|---|
| CN | 103722648 A | 4/2014 |
| CN | 103937426 B | 7/2014 |
| CN | 104589743 A | 5/2015 |
| CN | 104608452 B | 5/2015 |
| CN | 106073997 A | 11/2016 |
| CN | 107403688 A | 11/2017 |
| CN | 206749157 U | 12/2017 |
| CN | 208085162 U | 11/2018 |
| CN | 210826038 U | 6/2020 |
| CN | 210855938 U | 6/2020 |
| CN | 113279251 A | 8/2021 |
| DE | 102015222467 A1 | 5/2017 |
| EP | 0256756 A2 | 2/1988 |
| EP | 2687364 B1 | 1/2014 |
| EP | 2975681 A1 | 1/2016 |
| EP | 3284680 A1 | 8/2016 |
| ES | 2381135 T3 | 5/2012 |
| JP | H 0641515 A | 2/1994 |
| JP | H 06104903 A | 4/1994 |
| JP | H 06328630 A | 11/1994 |
| JP | H079607 A | 1/1995 |
| JP | H 0940919 A | 2/1997 |
| JP | H 09232176 A | 9/1997 |
| JP | 2000032717 A | 1/2000 |
| JP | 2002324998 A | 11/2002 |
| JP | 2003313781 A | 11/2003 |
| JP | 2006108055 A | 4/2006 |
| JP | 4188465 B2 | 11/2008 |
| JP | 2012104714 A | 5/2012 |
| JP | 2013005553 A | 1/2013 |
| JP | 6216944 B2 | 10/2017 |
| JP | 6770305 B2 | 10/2020 |
| JP | 2021082501 A | 5/2021 |
| KR | 100247488 B1 | 3/2000 |
| KR | 20060080691 A | 7/2006 |
| KR | 100841042 B1 | 6/2008 |
| KR | 100903434 B1 | 6/2009 |
| WO | WO2018038475 A1 | 3/2018 |

\* cited by examiner

SELF HEATING STRUCTURAL ADHESIVES FOR OUT-OF-AUTOCLAVE AND OUT-OF-OVEN CURING

TECHNICAL FIELD

The present disclosure is directed to structural adhesives.

BACKGROUND OF THE INVENTION

Today's helicopter and tilt-rotors blades are complex composite structures that utilize multiple types of materials and components. Typically, the components of the blade, such as the spar, leading edge, afterbody, and close out fairings are made as individual parts and then adhesively bonded together to produce the final product. To perform the adhesive bonding operations, the individual parts are placed in a fixture to hold them in position and then put into an autoclave or oven to heat cure the adhesive between the parts. This can happen multiple times to complete a blade, and may utilize multiple holding fixtures. The process of putting these parts in and out of the autoclave and/or oven is time consuming and costly. And with each heat cycle, the chances of flaws or defects is increased.

BRIEF SUMMARY OF THE INVENTION

One embodiment under the present disclosure comprises a method of joining components. The method includes coupling a plurality of surfaces together about an adhesive and a conductive scrim, the conductive scrim comprising a plurality of detachable leads; and associating the adhesive with a cure temperature and a time duration. The method can further include applying a current to the plurality of detachable leads so as to raise the temperature of the conductive scrim to the cure temperature; and maintaining the temperature of the conductive scrim near the cure temperature for the time duration.

Another embodiment comprises a method performed by a controller for curing an adhesive used to join components together. The method can comprise receiving an identification of an adhesive used to join a plurality of surfaces and receiving an identification of a conductive scrim, the conductive scrim coupled between the plurality of surfaces and comprising a plurality of leads. The method can further include associating the adhesive with a cure temperature and time duration needed to cure the adhesive so as to join the plurality of surfaces to each other about the conductive scrim; associating the conductive scrim with one or more levels of current needed to raise the adhesive to the cure temperature for the time duration; and applying the one or more levels of current to the plurality of leads.

A further embodiment can comprise a system for curing one or more layers of adhesive joining a plurality of components. The system can comprise one or more leads coupled to a conductive scrim, the conductive scrim disposed between the one or more layers of adhesive; one or more thermocouples configured to detect a temperature of a bond line between the plurality of components; and a controller coupled to the one or more leads and the one or more thermocouples. The controller can be configured to: receive an identification the one or more layers of adhesive; receive an identification of the conductive scrim; associate the adhesive with a cure temperature and time duration needed to cure the one or more layers of adhesive so as to join the plurality of components to each other about the conductive scrim; and associate the conductive scrim with one or more levels of current needed to raise the one or more layers of adhesive to the cure temperature for the time duration. The controller can further apply the one or more levels of current to the plurality of leads; receive one or more temperature readings from the one or more thermocouples; and adjust the one or more levels of current based on the one or more temperature readings so as to maintain the one or more layers of adhesive at the cure temperature for the time duration.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Embodiments under the present disclosure include systems and methods for a self-heating structural adhesive that can bond structural and other components together and be cured without the need for an oven or autoclave. In a preferred embodiment a conductive, non-woven scrim can be placed between layers of adhesive placed on components to be joined together. The components can be coupled so as to "sandwich" the scrim, held together, an electrical current applied to scrim so as to raise the temperature of the scrim and adhesive layers. The raised temperature can cure the adhesive layers, completing the joining process. Embodiments under the present disclosure allows for quicker, more efficient bonding processes, even allowing for onsite bonding operations. Schedule times would be reduced by eliminating multiple cures and the processes used for oven/autoclave cures. Defects and damage would be reduced by limiting heat cycles and the handling of the detail and sub-assemblies. Other areas that could benefit include field repairs of composite structures.

Figure 1:
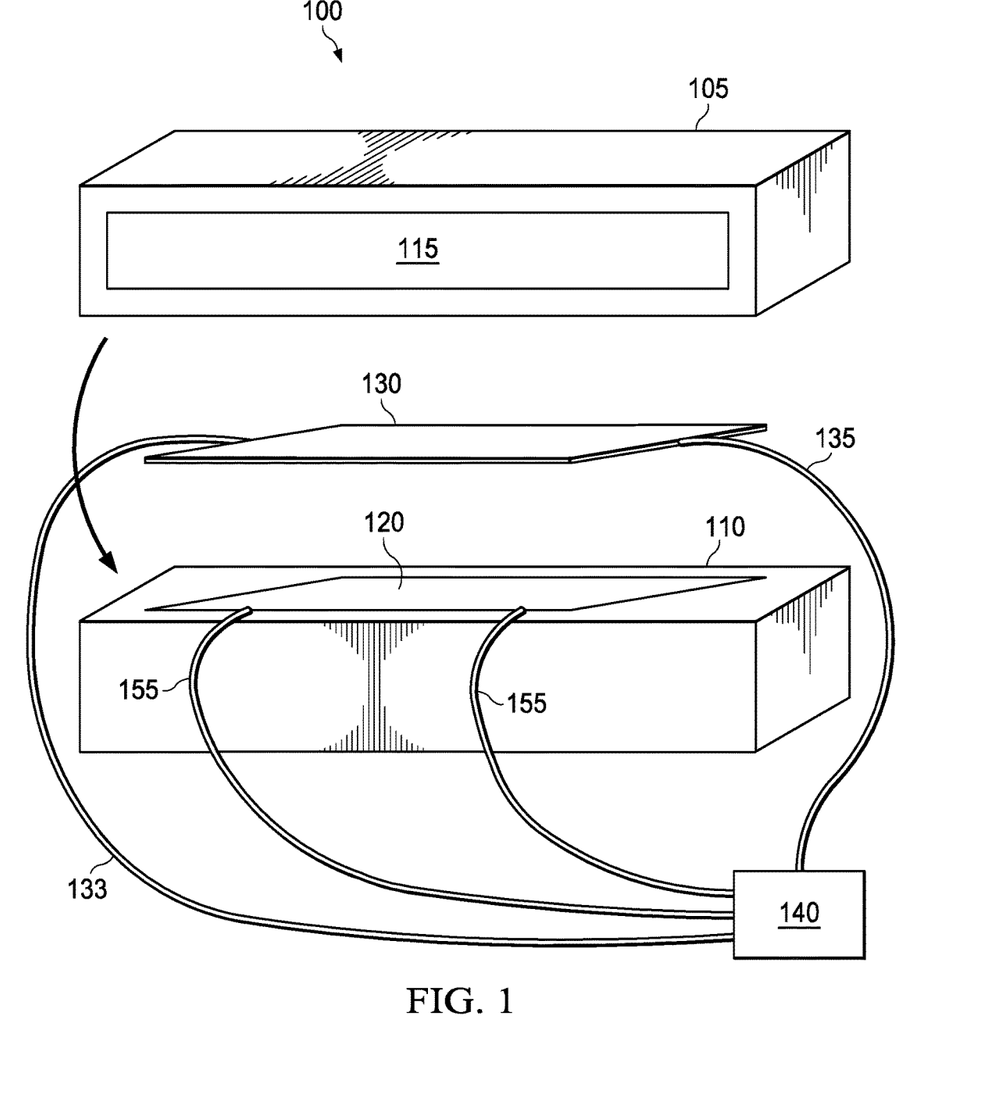
FIG. 1 displays a system embodiment for curing adhesives under the present disclosure.

FIG. 1 displays one bonding system embodiment under the present disclosure. System 100 is used for bonding components 105 and 110 together. Adhesive layers 115 and 120 have been applied to the surfaces of components 105, 110 that a user wishes to join. Conductive scrim 130 is placed between the components 105, 110 and adhesive layers 115, 120 and will be sandwiched between these parts. Leads 133, 135 are attached to conductive scrim 130 and are connected to a controller 140, which may comprise a power supply. A user can put components 105, 110 together, sandwiching the scrim 130 between adhesive layers 115, 120. Preferably, force is then applied push the components together. Clamps, vacuum bags, and other means can be used. Controller 140 can then apply an electrical current through scrim 130 via leads 133, 135. Curing time and temperature can depend on the exact adhesives used, component composition, environmental factors, and other variables. The controller 140 can apply current (immediately or increasing over time) to raise the temperature of scrim 130 and the adhesive layers 115, 120. Curing temperature in one example might be 300 C. The controller 140 can monitor the temperature via thermocouples 155. Curing time in one example might be two hours. After two hours controller 140 can turn off (immediately or decreasing power over time) the electrical current. Clamps or other means for applying pressure can be removed and the components 105, 110 are now bonded together. The curing process should cause conductive scrim 130 to be absorbed into the adhesive layers 115, 120, so that it adds no thickness to the bonding layer between components 105, 110 (i.e., no additional thickness versus an embodiment with adhesive layers and no scrim). Thermocouples 155 can be removed and leads 133, 135 can be detached from the scrim 130.

Leads 133, 135 preferably comprise copper crimped onto scrim 130. However, other materials and lead types are envisioned within embodiments under the present disclosure. Leads 133, 135 are preferably connected at fore and aft (or distal ends) of the components 105, 110 to be joined.

Thermocouples 155 can be connected in or out of the bond line, or can generally be placed somewhere adjacent to or within the adhesive layers 115, 120, components 105, 110, or scrim 130. Controller 140, in some embodiments, may need to know how and/or where a thermocouple is coupled. Any appropriate number of thermocouples 155 can be used. It some embodiments it may be desired to place the thermocouples 155 in sacrificial areas where there is the least impact on the bonding process or structural and bond strength. Thermocouples 155 may be placed at various parts or regions of the bonding system so that controller 140 can monitor temperature differentials across regions or components 105, 110.

Figure 2:
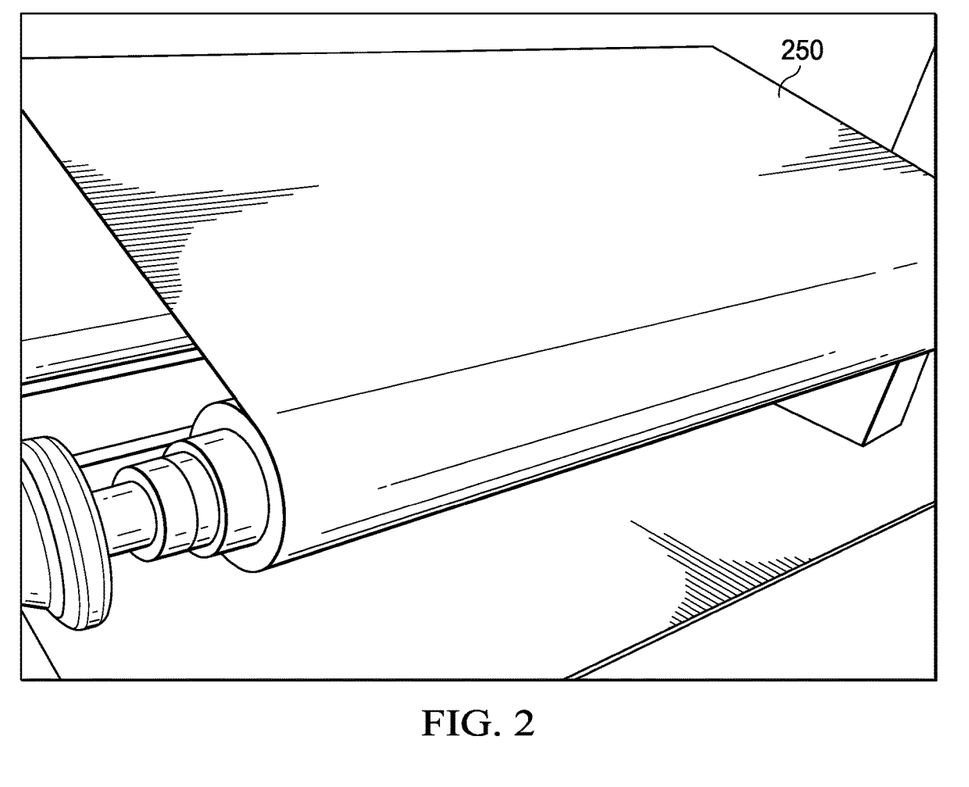
FIG. 2 displays a conductive scrim embodiment under the present disclosure.

Conductive scrim 130 preferably comprises a conductive material. Various conductive materials, and combinations thereof, can be used. Carbon fiber, silver, copper, aluminum, and other metals and alloys can be used. Scrim 130 can be a variety of sizes and thicknesses. Size may be determined by the components 105, 110 being joined. Any size or arrangement of scrims can be used. Scrim 130 will generally be approximately 0.002 to 0.1 inches thick. But other thicknesses can be used. Scrim 130 is preferably non-woven, which allows for even heat distribution when electric current is applied. A different view of a conductive scrim embodiment can be seen in FIG. 2. As can be seen, scrim 250 can be created in sheets that can be unspooled for use in adhesive systems such as described herein. Scrim 250 is non-woven.

Figure 3:
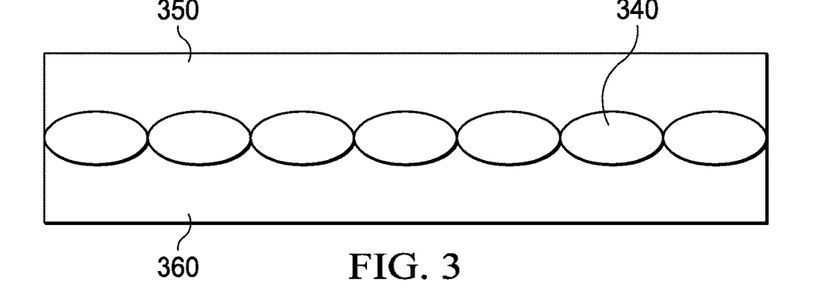
FIG. 3 displays an adhesives and conductive scrim embodiment under the present disclosure.

FIG. 3 shows a cross-sectional view of conductive scrim 340, first adhesive layer 350 and second adhesive layer 360. The entire thickness of scrim 340 and adhesive layers 350, 360 may only be several millimeters, before or after curing. The conductive scrim 340 and adhesive layers 350, 360 may be stored or deployed from sheets or rolls of material. However, other embodiments are possible.

Figure 4:
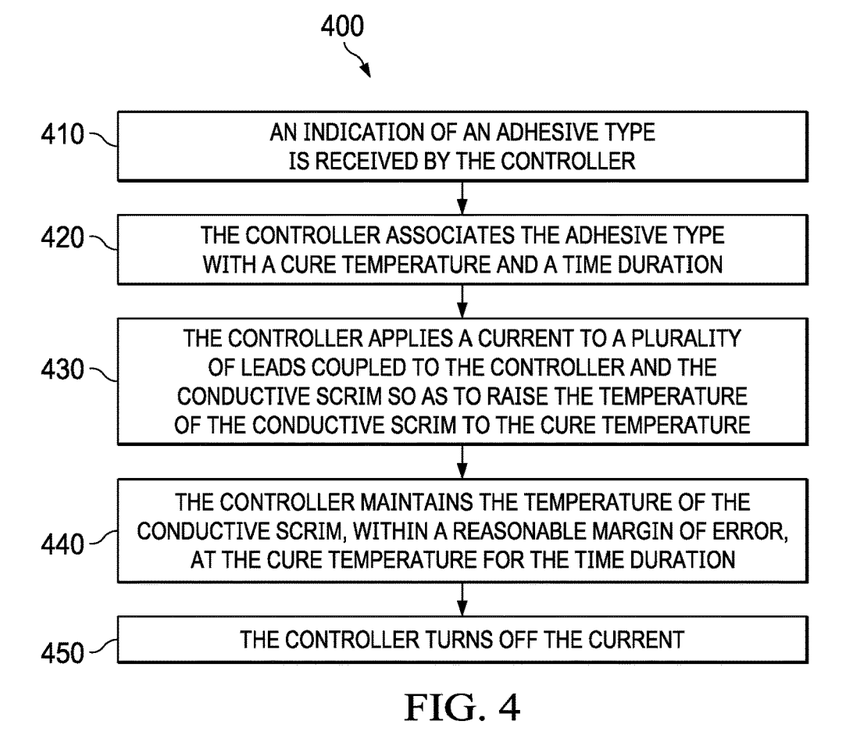
FIG. 4 is a flow chart of a method embodiment under the present disclosure.

Controller embodiments under the present disclosure, such as controller 140 of FIG. 1, preferably are configured to monitor the curing process, monitor temperature, adjust temperatures depending on adhesives being used, and act as a safety check on the curing process. FIG. 4 display a curing method for attaching two components that a controller 140 may apply. At step 410, an indication of an adhesive type can be received by the controller. At 420, the controller can associate the adhesive type with a cure temperature and a time duration. At 430, the controller can apply a current to a plurality of leads coupled to the controller and the conductive scrim so as to raise the temperature of the conductive scrim to the cure temperature. At 440, the controller can maintain the temperature of the conductive scrim, within a reasonable margin of error, at the cure temperature for the time duration. At 450, the controller can turn off the current.

Figure 5:
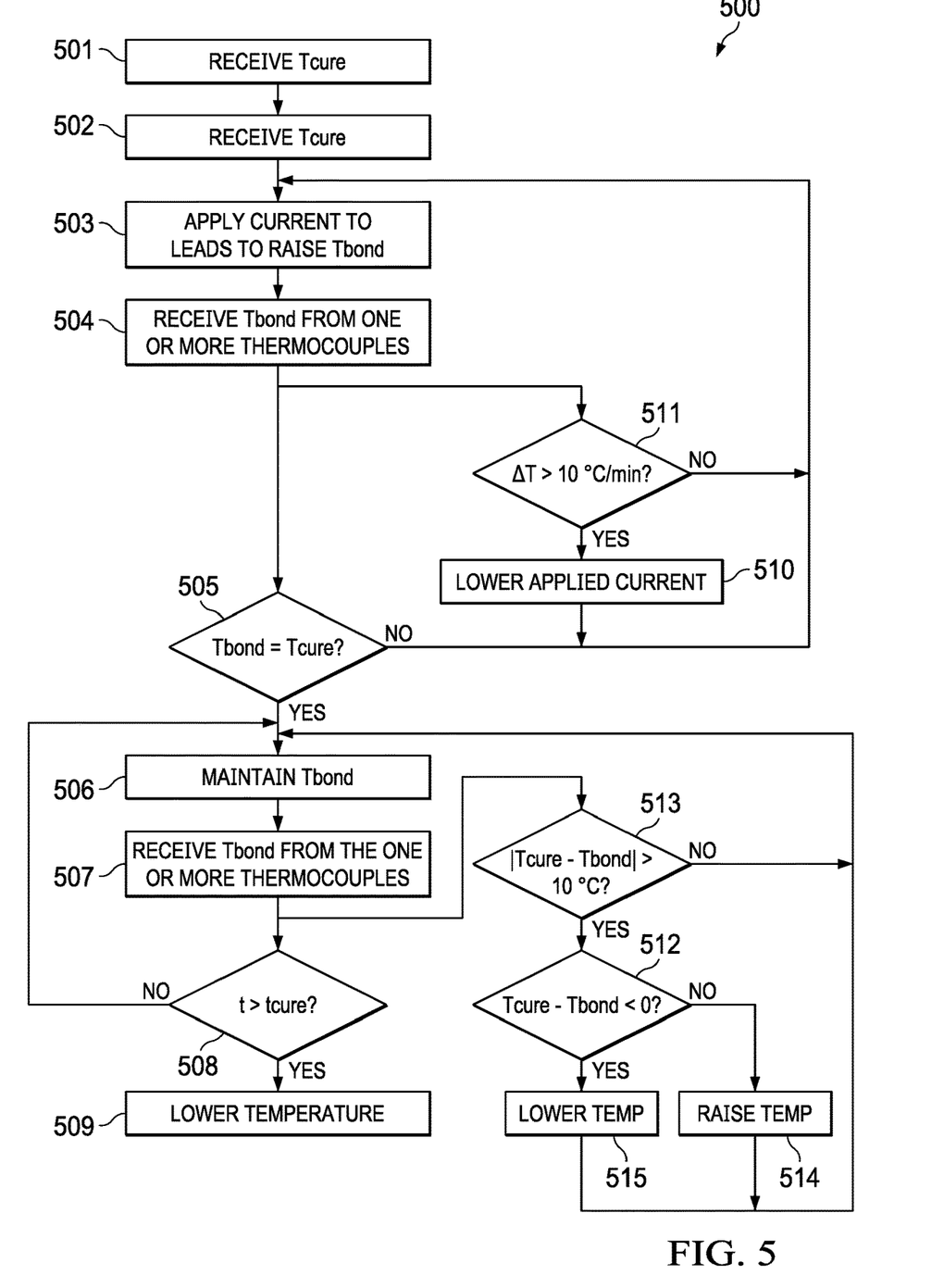
FIG. 5 is a flow chart of a method embodiment under the present disclosure.

Another method embodiment 500 of combining and curing several components is shown in FIG. 5. Method 500 can comprise more use of feedback, and inclusion of multiple variables, in a controller's algorithm. At step 501, the controller can receive Tcure, a temperature at which a bond/adhesive will cure. At 502, the controller can receive tcure, a time duration needed for the bonding. At 503, the controller applies current to a plurality of leads coupled to a conductive scrim sandwiched by adhesive layers. At 504, the controller receives Tbond, a current temperature of the bonding area. Tbond can comprise an average or combination of multiple temperature readings from multiple thermocouples. At 511, the rate of temperature increase ΔT, is compared to 10° C./min. If it is greater, then a lower current is applied, and the process returns to step 503. If it is not greater, then the process returns to step 503 without lowering the current. Other values besides 10° C./min can be used depending on the embodiment. At step 505, the current Tbond is compared to Tcure. If Tbond has reached Tcure, then the temperature is maintained at step 506. If Tbond still has not reached Tcure, then the process returns to step 503 and continues to increase Tbond. As the process maintains Tbond at Tcure, at step 506, at step 507 the current Tbond can be received from the thermocouples. In this example, it is desired that Tbond be kept at Tcure±10° C. (other embodiments can use different variances). The absolute value of Tcure−Tbond can be compared to 10° C., at step 513. If the different is less than 10° C. then the process returns to step 506. If the difference is greater than 10° C., then at step 512 it is determined if Tcure−Tbond<0. If yes, then the temperature is raised at step 514, and then returning to step 506. If no, then the temperature is lowered at step 515, returning then to step 506. The controller can track how long the process has been maintaining Tbond—given by t. As long as t<tcure at step 508, the process keeps maintaining Tbond, at 506. When time duration t reaches tcure, the time duration needed for bonding, at 508, then the controller begins lowering the temperature applied to the conductive scrim, at 509.

Steps 513, 512, 514, 515 begin with analyzing the absolute value of Tcure−Tbond. However, other embodiments may use different specific steps to determine whether to raise or lower Tbond so as to maintain Tbond within a desired error range. For example, the process could first determine whether Tbond is higher or lower than Tcure. From there, the process could raise or lower Tbond so as to get closer to Tcure.

Figure 6:
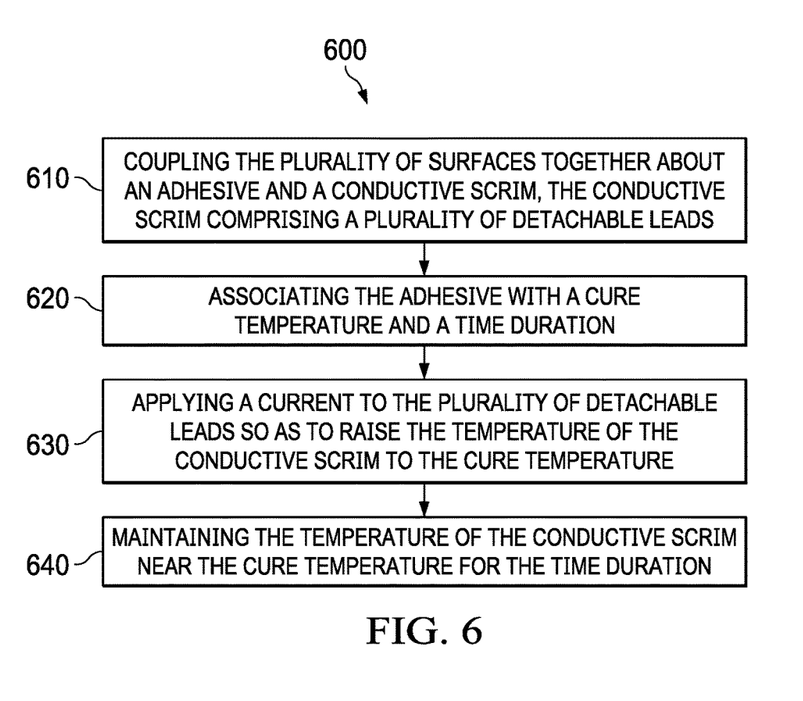
FIG. 6 is a flow chart of a method embodiment under the present disclosure.

FIG. 6 displays a possible method embodiment for joining components together. Step 610 is coupling the plurality of surfaces together about an adhesive and a conductive scrim, the conductive scrim comprising a plurality of detachable leads. Step 620 is associating the adhesive with a cure temperature and a time duration. Step 630 is applying a current to the plurality of detachable leads so as to raise the temperature of the conductive scrim to the cure temperature. And step 640 is maintaining the temperature of the conductive scrim near the cure temperature for the time duration.

Figure 7:
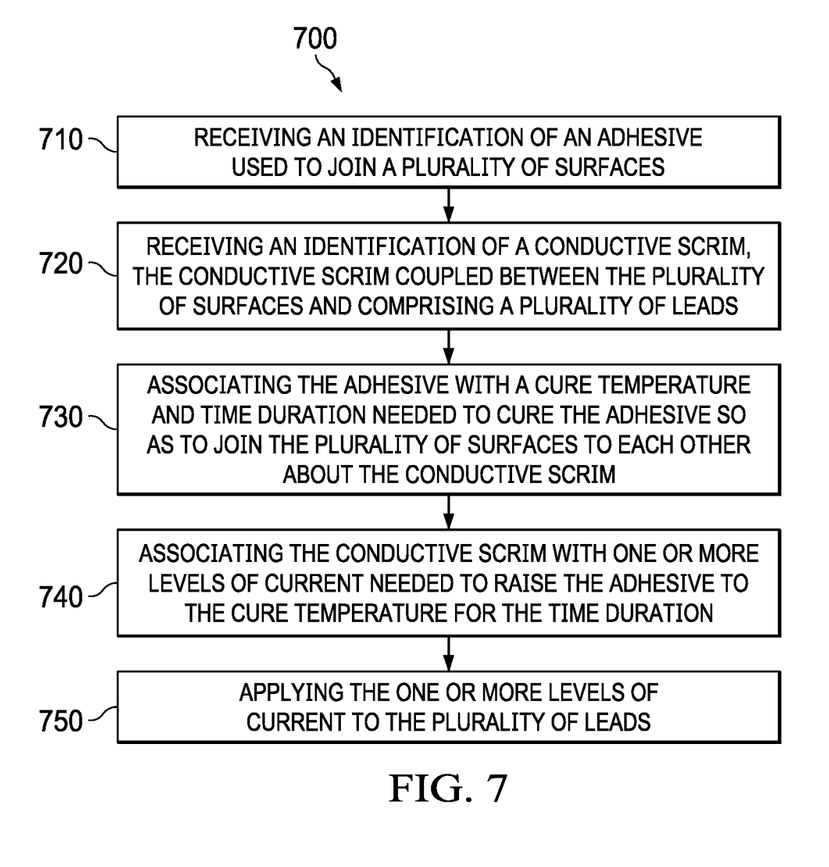
FIG. 7 is a flow chart of a method embodiment under the present disclosure.

FIG. 7 displays a possible method 700 performed by a controller for curing an adhesive used to join components together. Step 710 is receiving an identification of an adhesive used to join a plurality of surfaces. Step 720 is receiving an identification of a conductive scrim, the conductive scrim coupled between the plurality of surfaces and comprising a plurality of leads. Step 730 is associating the adhesive with a cure temperature and time duration needed to cure the adhesive so as to join the plurality of surfaces to each other about the conductive scrim. Step 740 is associating the conductive scrim with one or more levels of current needed to raise the adhesive to the cure temperature for the time duration. Step 750 is applying the one or more levels of current to the plurality of leads.

Figure 8:
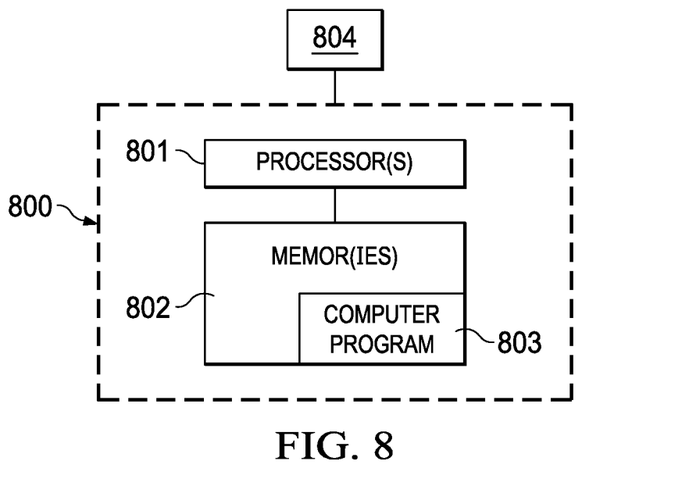
FIG. 8 shows a diagram of a controller embodiment under the present disclosure.

FIG. 8 shows a schematic block diagram of a controller 800 according to embodiments of the present disclosure. Memory 802 can have stored thereon a computer program 803 which, when executed on the processor 801, causes the processor 801 to carry out any of the methods described according to the present disclosure. User interface 804 may comprise a screen, touchscreen, keypad, or other means for receiving commands from a user. The memory 802 may be, e.g., an Electrically Erasable Programmable Read-Only Memory (EEPROM), a flash memory and a hard drive. The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program 803 may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules could in alternative embodiments be distributed on different computer program products in the form of memories within the controller 800.

In other embodiments of the present disclosure, there is provided a computer-readable storage medium having stored thereon a computer program 802 which, when executed on at least one processor, causes the at least one processor to carry out any applicable method according to the present disclosure.

Computer System Embodiments

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of joining components, the method comprising:
    coupling a plurality of surfaces together about an adhesive and a conductive scrim, the conductive scrim coupled to two or more leads by a coupling method and located in areas of the conductive scrim that are configured to be sacrificial after joining;
    associating the adhesive and the coupling method with a cure temperature and a time duration;
    applying a current to the two or more leads so as to raise the temperature of the conductive scrim to the cure temperature; and
    maintaining the temperature of the conductive scrim near the cure temperature for the time duration to thereby bond the components to each other, wherein the scrim is absorbed into the adhesive such that the scrim adds no thickness to a bonding layer between the components.

2. The method of claim 1 further comprising lowering the current after the time duration.

3. The method of claim 1 further comprising detaching the plurality two or more leads after the time duration.

4. The method of claim 1 wherein applying a current comprises raising the temperature at 3° Celsius or less per 10 minutes.

5. The method of claim 1 further comprising coupling one or more thermocouples to a bond line coupling the plurality of surfaces.

6. The method of claim 5 further comprising receiving temperature readings from the one or more thermocouples while applying the current.

7. The method of claim 6, further comprising, if the temperature readings are greater than 10° Celsius away from the cure temperature, then applying more or less current to bring the temperature readings closer to the cure temperature.

8. The method of claim 1 further comprising applying a vacuum bag to secure the plurality of surfaces together about the conductive scrim.

9. A method performed by a controller for curing an adhesive used to join components together, the method comprising:
   receiving an identification of an adhesive used to join a plurality of surfaces;
   receiving an identification of a conductive scrim, the conductive scrim coupled between the plurality of surfaces and comprising a plurality of leads located in areas of the conductive scrim that are configured to be sacrificial after curing;
   associating the adhesive with a cure temperature and time duration needed to cure the adhesive so as to join the plurality of surfaces to each other about the conductive scrim;
   associating the conductive scrim with one or more levels of current needed to raise the adhesive to the cure temperature for the time duration; and
   applying the one or more levels of current to the plurality of leads to thereby bond the components to each other, wherein the conductive scrim is absorbed into the adhesive such that the scrim adds no thickness to a bonding layer between the components.

10. The method of claim 9 further comprising receiving two or more temperature readings from two or more thermocouples coupled to the controller, the two or more thermocouples configured to measure two or more temperatures of the adhesive.

11. The method of claim 9 further comprising applying the one or more levels of current so as to maintain a temperature of the conductive scrim within 5° Celsius of the cure temperature.

12. The method of claim 9 further comprising applying the one or more levels of current so as to raise a temperature of the conductive scrim at 10° Celsius or less per 10 minutes until the cure temperature is reached.

13. The method of claim 9 further comprising applying the one or more levels of current so as to lower the temperature of the conductive scrim after the time duration at a rate of 5° Celsius or less per 10 minutes.

14. The method of claim 9 further comprising adjusting the cure temperature and the time duration based at least in part on the identification of the conductive scrim.

15. The method of claim 10 further comprising using the two or more temperature readings to assess a temperature differential across a region between the two or more thermocouples.

16. The method of claim 15 further comprising:
   receiving an identification of two or more locations of the two or more thermocouples coupled to the controller; and
   adjusting the one or more current levels based on the two or more temperature readings and the two or more locations.

* * * * *